United States Patent
Marmo

(10) Patent No.: US 10,155,552 B2
(45) Date of Patent: Dec. 18, 2018

(54) AERODYNAMIC STRAKES FOR UNDERBODY PANELS OF MOTOR VEHICLES

(71) Applicant: GM GLOBAL TECHNOLOGY OPERATIONS LLC, Detroit, MI (US)

(72) Inventor: Anthony V. Marmo, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 35 days.

(21) Appl. No.: 15/419,109

(22) Filed: Jan. 30, 2017

(65) Prior Publication Data

US 2018/0215424 A1    Aug. 2, 2018

(51) Int. Cl.
*B62D 35/02* (2006.01)
*B62D 29/00* (2006.01)
*B62D 29/04* (2006.01)

(52) U.S. Cl.
CPC ........ *B62D 35/02* (2013.01); *B60Y 2410/121* (2013.01); *B60Y 2410/122* (2013.01); *B62D 29/008* (2013.01); *B62D 29/041* (2013.01)

(58) Field of Classification Search
CPC ...... B62D 35/02; B62D 37/02; B62D 29/041; B62D 29/008
USPC ............................................ 296/180.5, 181.5
See application file for complete search history.

(56) References Cited

U.S. PATENT DOCUMENTS

| | | | |
|---|---|---|---|
| 4,455,045 A * | 6/1984 | Wheeler | B62D 35/00 105/1.2 |
| 4,867,397 A | 9/1989 | Pamadi et al. | |
| 5,280,990 A | 1/1994 | Rinard | |
| 5,360,252 A | 11/1994 | Larsen | |
| 5,908,217 A | 6/1999 | Englar | |
| 6,196,620 B1 * | 3/2001 | Haraway, Jr. | B62D 35/007 180/903 |
| 6,283,407 B1 | 9/2001 | Hakenesch | |
| 7,192,077 B1 | 3/2007 | Hilleman | |
| 7,255,387 B2 | 8/2007 | Wood | |
| 7,431,381 B2 | 10/2008 | Wood | |
| 8,196,994 B2 | 6/2012 | Chen | |
| 8,366,178 B2 * | 2/2013 | Yamagishi | B62D 35/02 180/903 |
| 8,668,254 B2 * | 3/2014 | Onodera | B62D 35/02 180/69.1 |
| 9,132,904 B2 | 9/2015 | Durham | |

(Continued)

*Primary Examiner* — Pinel E Romain
(74) *Attorney, Agent, or Firm* — Quinn IP Law

(57) ABSTRACT

Disclosed are body panel strakes for improved vehicle aerodynamics, methods for making and methods for using such aerodynamic strakes, and motor vehicles employing aerodynamic strakes for reducing turbulent flow and developing higher static pressure at the rear of the vehicle. An underbody panel for a motor vehicle is disclosed. The motor vehicle includes a vehicle body with an undercarriage spanning between front and rear vehicle ends. The underbody panel includes a panel body that attaches to the vehicle body and covers a portion of the undercarriage. One or more elongated air strakes are attached to and project from the panel body. Each air strake includes an elongated body that extends longitudinally with respect to the vehicle and has an inboard-facing curvature. The air strake guides airflow traveling fore-to-aft along the undercarriage in an inboard direction to thereby increase static pressure on the rear end of the vehicle.

20 Claims, 2 Drawing Sheets

(56) References Cited

U.S. PATENT DOCUMENTS

| | | |
|---|---|---|
| 2009/0026797 A1 | 1/2009 | Wood |
| 2010/0181799 A1 | 7/2010 | Ryan et al. |
| 2011/0068604 A1 | 3/2011 | Neuberger et al. |
| 2011/0095564 A1 | 4/2011 | Chen |
| 2011/0095566 A1 | 4/2011 | Chen |
| 2011/0148140 A1 | 6/2011 | Benton |
| 2011/0175395 A1 | 7/2011 | Guigne et al. |
| 2013/0062908 A1 | 3/2013 | Henderson et al. |
| 2016/0272257 A1* | 9/2016 | McKillen ............. B62D 35/005 |
| 2017/0057565 A1* | 3/2017 | Sarhadiangardabad ................... B62D 35/02 |
| 2017/0113741 A1* | 4/2017 | Wolf ................. B62D 35/02 |
| 2017/0190364 A1* | 7/2017 | Fahland ............. B62D 35/02 |
| 2017/0297637 A1* | 10/2017 | Shinedling ......... B62D 35/02 |
| 2017/0305479 A1* | 10/2017 | Caples .............. B62D 35/02 |

\* cited by examiner

AERODYNAMIC STRAKES FOR UNDERBODY PANELS OF MOTOR VEHICLES

INTRODUCTION

The present disclosure relates generally to features for improving the aerodynamic characteristics of motor vehicles. More specifically, aspects of this disclosure relate to systems, methods and devices for reducing aerodynamic drag caused by wake turbulence and low static pressure bubbles.

Many current production motor vehicles, such as the modern-day automobile, are originally equipped with or retrofit to employ stock body hardware and aftermarket accessories engineered to improve the aerodynamic characteristics of the vehicle. Air dams and splitters, for example, modify the flow of air passing under the vehicle body to balance the distribution of fore and aft downforce. As the name implies, an air dam is a fluid barrier structure mounted underneath or integrated with the front-end bumper structure of the vehicle body, extending downward into proximity with the roadway. Air dams—or more colloquially "front spoilers"—enhance vehicle aerodynamics and stability by blocking and redirecting the flow of turbulent airflowing under the chassis. Splitters, on the other hand, typically appear as a flat extension to the very bottom of the front bumper, extending forward and parallel to the ground. A splitter acts like a wedge that forces high pressure air upwards and over the vehicle, and forces high speed, low pressure air underneath the car, resulting in a net positive downforce.

While splitters and air dams are designed to modify the aerodynamic characteristics at the front end of a vehicle, spoilers and diffusers operate to modify aerodynamic flow at the rear end of a vehicle. An air spoiler is normally anchored on top of the trunk lid or rear roof rail and is shaped similar in geometry to an inverted airfoil that modifies airflow and generates an aerodynamic pressure gradient that produces downforce on the rear tires. A rear diffuser, on the other hand, uses a series of specially formed channels on the aft part of the vehicle underbody that improves aerodynamic properties by ameliorating the transition between high-velocity airflow along the undercarriage and the much slower freestream airflow of surrounding ambient air. Generally speaking, a rear diffuser helps underbody airflow to decelerate and expand by providing pressure recovery so that it does not cause excessive flow separation and drag.

SUMMARY

Disclosed herein are aerodynamic strakes for body panels of motor vehicles, methods for making and methods for using such aerodynamic strakes, and motor vehicles employing aerodynamic strakes for reducing turbulent flow and increasing static pressure at the rear of the vehicle. By way of example, and not limitation, there is presented a rear fascia, lower valence closeout panel with a pair of longitudinally spaced, arcuate air strakes that reduce aerodynamic drag by managing the turbulent airflow present in a vehicle's wake. The geometry of each strake may be in the nature of an elongated body with a polygonal longitudinal cross section and an inboard facing, convex (to airflow) curvature. For at least some embodiments, each air strake has a height of about 5 millimeters (mm) to about 20 mm or, in a specific example, a height of approximately 10 mm. For at least some embodiments, each air strake has a length of about 200 mm to about 350 mm or, in some specific examples, a length of approximately 245 mm or approximately 310 mm. These strakes are designed to guide turbulent air in the wake of the rear wheels inboard, which helps to develop higher static pressure on the rear of the vehicle, in effect pushing the vehicle forward and thereby reducing drag.

Attendant benefits for at least some of the disclosed concepts include underbody aerodynamic enablers that help achieve design targets for aerodynamic performance and vehicle fuel economy. At least some of the disclosed air strake architectures, for example, help to achieve a measurable aerodynamic drag reduction of the drag coefficient (CD) by at least 0.004 CD. Disclosed air strake architectures provide a novel way of reducing aerodynamic drag, while minimizing additional cost per vehicle, minimizing added vehicle weight, and reducing design complexity, while not detracting from aesthetic appeal. Disclosed air strakes can be easily incorporated into the mold of a lower valence closeout panel, at little or no cost or impact to best practices. On high-performance vehicle variants, the design of these strakes can be incorporated to the aesthetics of the rear fascia panels.

Aspects of the present disclosure are directed to vehicle body panels, such as rear fascia valence closeout panels, with air strakes for reducing aerodynamic drag on the vehicle. In an example, there is disclosed an underbody panel for improving the aerodynamic characteristics of a motor vehicle. The motor vehicle includes a vehicle body with an undercarriage spanning between front and rear ends of the vehicle. The underbody panel includes a panel body that attaches to the vehicle body and covers at least a portion of the undercarriage. One or more elongated air strakes are integrally formed with or otherwise attached to the panel body, projecting downward therefrom. Multiple air strakes may be longitudinally spaced from each other with respect to the vehicle body. Each air strake includes an elongated strake body that extends longitudinally with respect to the vehicle body and has an inboard-facing curvature (e.g., concavity faces inboard). Each air strake may have a distinct length, cross-section and/or curvature. The air strake is configured to guide airflow traveling fore-to-aft along the vehicle undercarriage in an inboard direction to thereby increase static pressure on the rear end of the motor vehicle.

Other aspects of the present disclosure are directed to motor vehicles with aerodynamic strakes for reducing aerodynamic drag by attenuating turbulent flow and increasing static pressure in the vehicle's wake. A "motor vehicle," as used herein, may include any relevant vehicle platform, such as passenger vehicles (internal combustion engine (ICE), hybrid electric, full electric, fuel cell, fuel cell hybrid, fully or partially autonomous, etc.), commercial vehicles, industrial vehicles, tracked vehicles, off-road and all-terrain vehicles (ATV), farm equipment, etc. In an example, a motor vehicle is presented that includes a vehicle body with an undercarriage spanning the underside of the body between the vehicle front and rear ends. A rear bumper fascia panel is mounted at the rear end of the motor vehicle, e.g., adjacent a rear quarter panel and trunk lid.

Mounted at the rear end of the vehicle body is a pair of underbody closeout panels. Each of the closeout panels includes a pair of elongated air strakes integrally formed with or otherwise attached to a panel body. The panel body includes mounting structure for attaching to a lateral portion of the vehicle body's undercarriage adjacent the rear bumper fascia panel such that the panel body extends across and covers a portion of the undercarriage. The elongated air strakes project, e.g., in a generally orthogonal manner, from the panel body. Each air strake includes an elongated strake body that extends longitudinally with respect to the vehicle body and has an inboard-facing curvature (e.g., bends or opens inwards towards the center of the vehicle). These air strakes guide airflow traveling fore-to-aft along the undercarriage in an inboard and aft direction to thereby increase static pressure on the rear end of the motor vehicle.

Additional aspects of this disclosure are directed to methods of making and methods of using body panel strakes for reducing aerodynamic drag by attenuating turbulent flow and increasing static pressure in the vehicle wake. For instance, a method is disclosed for forming an underbody panel for improving the aerodynamic characteristics of a motor vehicle. The method includes, in any order and in any combination with any disclosed options: forming a panel body configured to attach to the vehicle body and cover at least a portion of the vehicle undercarriage; and attaching an elongated air strake to the panel body such that the air strake projects from the panel body, the air strake including an elongated strake body extending longitudinally with respect to the vehicle body and having an inboard-facing curvature. The air strake is shaped, sized and positioned to guide airflow traveling fore-to-aft along the vehicle undercarriage in an inboard direction to thereby increase static pressure on the rear end of the motor vehicle. The attaching step may include attaching first and second elongated air strakes to the panel body. The air strakes may be attached such that the first air strake is longitudinally spaced from the second air strake. The forming and attaching steps in the foregoing method may include integrally forming the panel body and air strake as a single-piece, unitary structure. The air strakes can be each be formed with a different length, a different height, a different width, and/or a different maximum camber.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes any and all combinations and subcombinations of the elements and features presented above and below.

Figure 1:
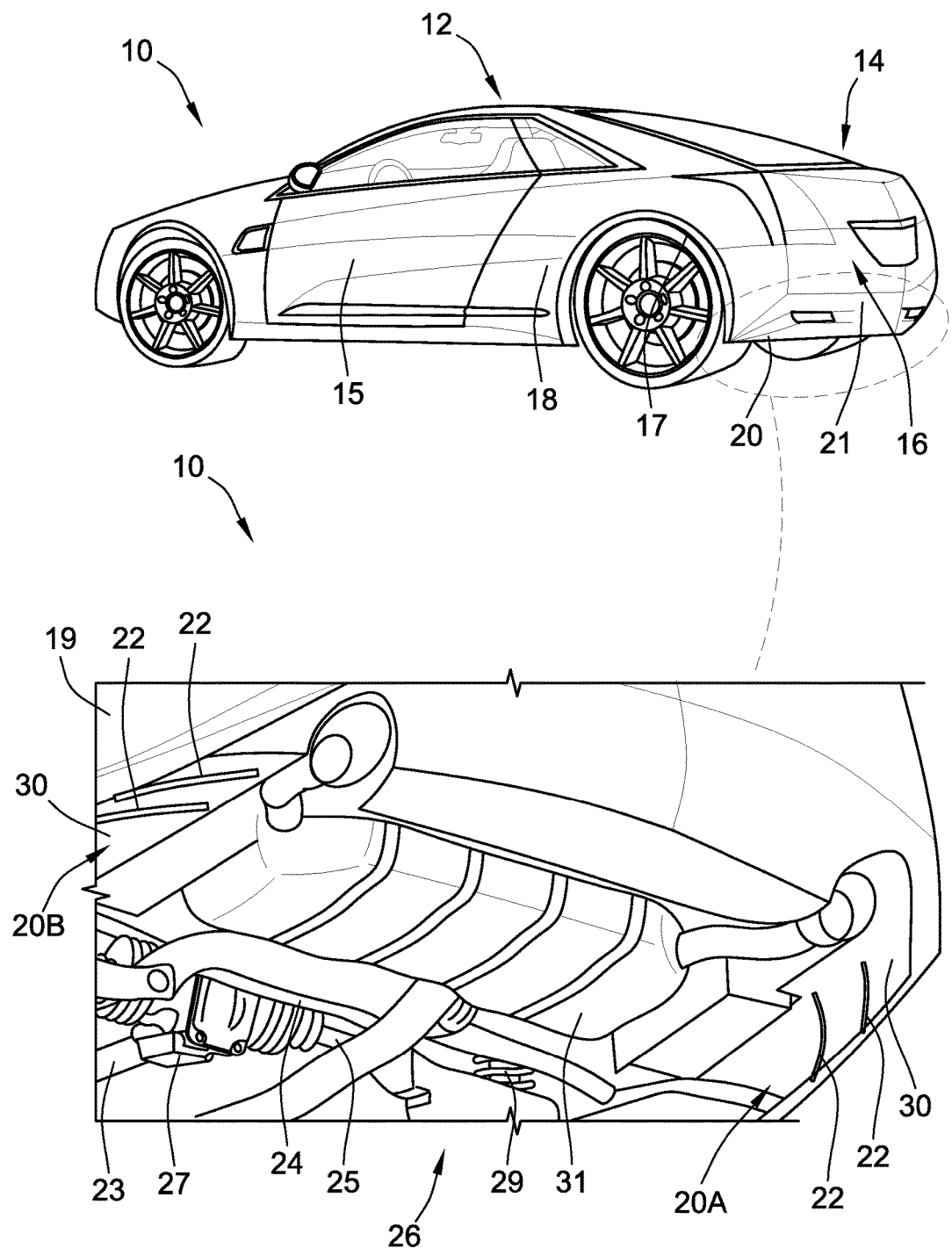
FIG. 1 is a rear perspective-view illustration of a representative motor vehicle with an inset perspective view of the vehicle's undercarriage to show two representative underbody closeout panels with curved air strakes for improved aerodynamic flow in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure.

DETAILED DESCRIPTION

This disclosure is susceptible of embodiment in many different forms. There are shown in the drawings and will herein be described in detail representative embodiments of the disclosure with the understanding that these representative embodiments are to be considered an exemplification of the principles of the disclosure and are not intended to limit the broad aspects of the disclosure to the illustrated embodiments. To that extent, elements and limitations that are disclosed, for example, in the Abstract, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example. Lastly, directional adjectives, such as fore, aft, inboard, outboard, vertical, horizontal, upward, downward, etc., may be with respect to a motor vehicle, such as a forward driving direction of a motor vehicle, when said vehicle is operatively oriented on a normal driving surface.

Referring now to the drawings, wherein like reference numbers refer to like features throughout the several views, there is shown in FIG. 1 a perspective-view illustration of a representative automobile, which is designated generally at 10 and portrayed herein for purposes of discussion as a two-door coupe-style passenger vehicle. Mounted to the vehicle 10 body, e.g., aft of a passenger compartment 12 and underneath a rear cargo compartment 14 (also referred to herein as "trunk"), inboard from a rear bumper assembly 16 and aft of rear wheel wells 17, is a pair of vehicle underbody panels 20 with air strakes 22 for improving aerodynamic performance of the vehicle 10. The illustrated automobile 10—also referred to herein as "motor vehicle" or "vehicle" for short—is merely an exemplary application with which the novel aspects and features of this disclosure may be practiced. In the same vein, implementation of the present concepts into rear fascia lower valence closeout panels should also be appreciated as an exemplary application of the novel concepts disclosed herein. As such, it will be understood that the aspects and features of the present disclosure may be incorporated into other vehicle body panels, and may be implemented for any logically relevant type of motor vehicle. Lastly, the drawings presented herein are not necessarily to scale and are provided purely for instructional purposes. Thus, the specific and relative dimensions shown in the drawings are not to be construed as limiting.

With collective reference to the perspective and inset views presented in FIG. 1, the automobile 10 is originally equipped with opposing front and rear bumper assemblies, only the latter of which is visible in the views provided. Rear bumper assembly 16 extends generally transversely across the rear end of the vehicle 10 and is mounted to complementary frame members (not shown) of a vehicle chassis frame 24. Bumper assembly 16 generally comprises a high strength yet deformable bumper crossbeam (not shown) that is covered by a rear bumper fascia 19 (i.e., an A-surface cladding). Adjoined to opposing outboard portions of the rear bumper fascia 19 is a pair of rear quarter panels 18 (only one of which can be seen in the drawings; a mirror counterpart is disposed on the opposite side of the vehicle 10). The rear quarter panel 18 is an exterior (Class A Surface) body panel located aft of the vehicle passenger compartment 12, e.g., interposed between a rear-most occupant door 15 and rear bumper fascia 19, that at least partially defines a rear wheel well 17. Bumper assembly 16 may further comprise a lower valence 21 attached to a lower portion of the bumper fascia 18. Along the underside of the vehicle 10 is an undercarriage, designated generally at 26, which may be typified as the supporting framework for holding a drivetrain prop shaft 23, axles 25, and rear differential 27, as well as suspension system components, including springs 29, an exhaust system components, such as muffler 31.

To improve aerodynamic performance and fuel efficiency, the vehicle 10 is equipped with one or more vehicle underbody panels 20 with air strakes 20 for reducing aerodynamic drag by managing turbulent airflow and increasing static pressure in the vehicle's wake. In the illustrated architecture, for example, there are two underbody panels 20—a first underbody panel 20A located on the right-hand (starboard) side and a second underbody panel 20B located on the left-hand (port) side of the vehicle—mounted at the rear of the undercarriage 26 in adjoining relationship to the lower valence of rear bumper fascia 19. It is envisioned that the vehicle 10 include greater or fewer underbody panels 20, packaged at similar or different locations and/or in similar or different orientations, than that which are shown in the drawings. While not per se required, the two underbody panels 20 of FIG. 1 may be substantially identical mirrored counterparts; thus, for purposes of brevity, structural features of both assemblies can be described by way of reference to the first (starboard side) underbody panel 20A, which is enlarged in FIG. 2.

Figure 2:
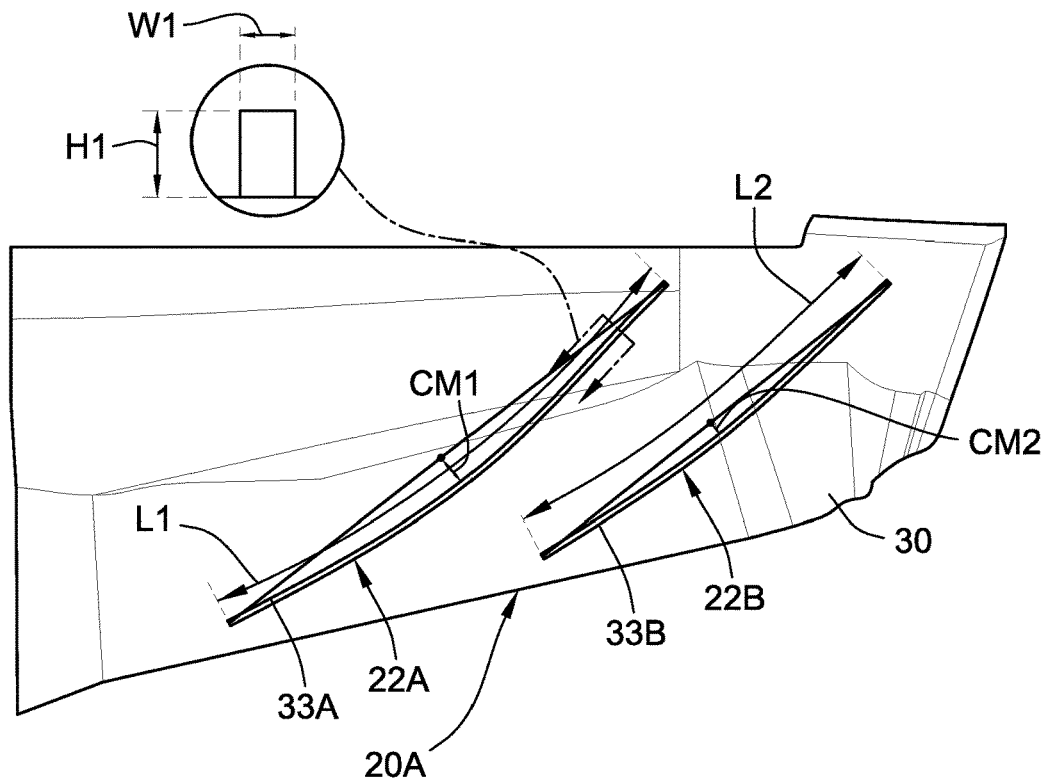
FIG. 2 is a plan-view illustration of one of the representative closeout panels with aerodynamic strakes of FIG. 1.

Each of the underbody panels 20 is fabricated with a panel body 30 designed to attach, e.g., via threaded fasteners, push pins, mounting brackets, or male-female lock tabs, to the vehicle body adjacent the rear bumper fascia panel 19. According to the illustrated example, each panel body 30 extends across and covers a discrete portion of the undercarriage 26. While innumerable shapes and sizes are envisioned, the panel body 30 of FIGS. 1 and 2 is elongated with a contoured lower-most surface. It may be desirable, for at least some embodiments, that the underbody panel 20 be fabricated from a robust and rigid yet light-weight and weather resistant material, such as steel, aluminum or titanium alloys, carbon fiber composites, polyethylenes, polypropylenes, polyethers, polycarbonates, polyethylene terephthlates (PET), polyvinyl chlorides (PVC), or any combination thereof. It is further envisioned that the underbody panel 20 may be fabricated as discrete components that are subsequently assembled into a bipartite or tripartite unit; it may be desirable, however, that the entire underbody panel 20, including the air strakes 22 and panel body 30, be integrally formed (e.g., via stamping or injection molding) as a single-piece unitary structure.

To help direct airflow across predesignated vehicle control surfaces at specific angles of attack, one or more elongated air strakes 22 (also referred to herein as "aerodynamic strakes" or merely "strakes" for brevity) are integrally formed with, mounted on, or otherwise attached to the panel body 30. With reference to the exemplar design set forth in FIG. 2, first and second elongated air strakes 22A and 22B project orthogonally downward from the lower-most surface of the panel body 30. The first air strake 22A is longitudinally spaced forward from the second air strake 22B such that the forward and rearward ends of the second air strake 22B are closer to the tail end of the vehicle 10 than the forward and rearward ends of the first air strake 22A, respectively. Each representative air strake 22A, 22B is formed with an elongated, continuous strake body 33A and 33B that extends generally longitudinally (i.e., in a fore-to-aft direction) with respect to the vehicle body. As shown, the strake bodies 33A, 33B have curvilinear plan view profiles with inboard-facing radii of curvature. An inset view presented in FIG. 2 shows that each air strake body 33A, 33B may have a polygonal (e.g., a rectangular-shaped) longitudinal cross section with a height H1 of about 5 mm to about 20 mm and a width W1 of about 2 mm to about 10 mm. In a specific example, both strakes 22A, 22B have a height of approximately 10 mm and a width of approximately 3 mm. While a specific geometric configuration is illustrated in the drawings, it should be appreciated that the air strakes 22A, 22B can take on different shapes and dimensions without departing from the intended scope of this disclosure.

Figure 3:
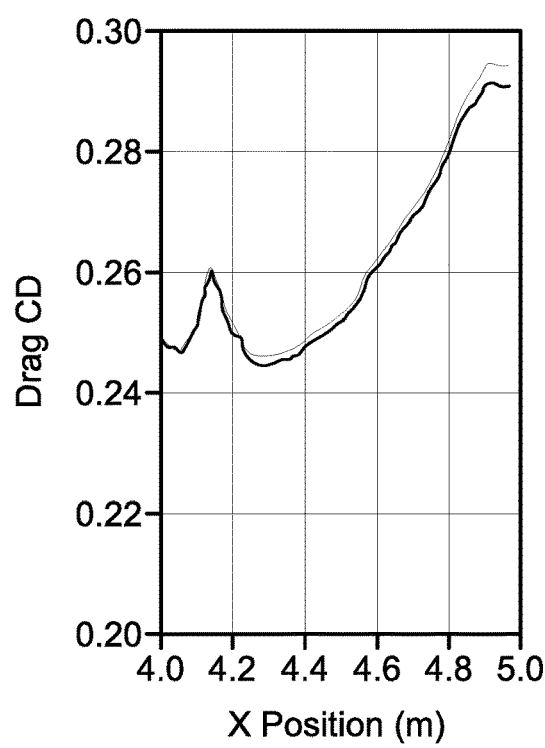
FIG. 3 is a graph showing drag development along the rear length of a vehicle with the air strake architecture of FIG. 1 in comparison to a baseline vehicle case without the strake architecture.

The air strakes 22A and 22B of the underbody panel 20A may have similar or distinct lengths, curvature profiles and/or cross-sectional geometries. By way of non-limiting example, the air strakes 22A, 22B may have a respective or common length of about 200 mm to about 350 mm. In accord with the illustrated example, the first air strake 22A has a first centerline length L1 of approximately 310 mm, whereas the second air strake 22B has a second centerline length L2 of approximately 245 mm. In the same vein, the air strakes 22A, 22B may have a respective or common maximum camber of about 5 mm to about 25 mm. As used herein, "maximum camber" may be defined as the perpendicular distance between the point of maximum curvature of the strake body to a straight line drawn from opposite ends/tips of each strake. As illustrated in FIG. 2, for example, the first air strake 22A has a first distinct plan-view curvature profile defined, in part, by a first inboard-facing curvature with a first maximum camber CM1, e.g., of approximately 19 mm. Comparatively, the second air strake 22B has a second distinct plan-view curvature profile defined, in part, by a second inboard-facing curvature with a second maximum camber CM2, e.g., of approximately 9 mm. As used herein, "inboard-facing curvature" may be defined to mean an object, or a surface or segment of an object, that bends and/or opens inwards towards the center of the vehicle (e.g., concavity faces inboard). With the disclosed location, orientation and structural design, these air strakes 22A, 22B help to guide airflow traveling fore-to-aft along the undercarriage in an inboard and aft direction to thereby increase static pressure on the rear end of the motor vehicle. As seen in FIG. 3, for example, air strakes 22A, 22B help to achieve a measurable aerodynamic drag reduction of at least 0.004 CD, which may equate to a reduction of 1.0 g$CO_2$/mi per vehicle (e.g., a 0.6 g$CO_2$/mi per vehicle reduction on EPA FTP Combined Cycle or a 1.25 g$CO_2$/mi per vehicle reduction on US06 Cycle).

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed:

1. An underbody panel for improving aerodynamic characteristics of a motor vehicle, the motor vehicle including a vehicle body with a front end, a rear end, a rear wheel well, and an undercarriage, the underbody panel comprising:
    a panel body configured to attach to the vehicle body aft of the rear wheel well and adjacent the rear end of the vehicle body, the panel body being configured to cover at least a portion of the undercarriage; and
    an elongated air strake attached to and projecting from the panel body, the air strake including an elongated strake body extending longitudinally with respect to the vehicle body and having an inboard-facing curvature, the elongated strake body having a substantially uniform width along a length of the air strake,
    wherein the air strake is configured to guide airflow traveling fore-to-aft along the undercarriage in an inboard direction to thereby increase static pressure on the rear end of the motor vehicle.

2. The underbody panel of claim 1, wherein the air strake includes first and second elongated air strakes attached to and projecting from the panel body.

3. The underbody panel of claim 2, wherein the first air strake is longitudinally spaced from the second air strake with respect to the vehicle body.

4. The underbody panel of claim 2, wherein the first air strake has a first length and the second air strake has a second length less than the first length.

5. The underbody panel of claim 2, wherein the first air strake has a first inboard-facing curvature profile and the second air strake has a second inboard-facing curvature profile that is distinct from the first inboard-facing curvature profile.

6. The underbody panel of claim 1, wherein the air strake has a polygonal longitudinal cross section.

7. The underbody panel of claim 1, wherein the air strake has a height of about 5 mm to about 20 mm.

8. The underbody panel of claim 1, wherein the air strake has a length of about 200 mm to about 350 mm.

9. The underbody panel of claim 1, wherein the air strake has a max camber of about 5 mm to about 25 mm.

10. The underbody panel of claim 1, wherein the vehicle body includes a rear bumper fascia mounted at the rear end of the motor vehicle, and wherein the panel body is configured to mount to the vehicle body to adjoin the rear bumper fascia.

11. The underbody panel of claim 1, wherein the panel body is elongated with a contoured lower-most surface.

12. The underbody panel of claim 1, wherein the panel body and the air strake are integrally formed as a single-piece, unitary structure.

13. A motor vehicle, comprising:
    a vehicle body with a front end, a rear end opposite the front end, a pair of rear wheel wells proximate the rear end, and an undercarriage spanning between the front and rear ends, the vehicle body including a rear bumper fascia panel at the rear end of the motor vehicle; and
    a pair of underbody closeout panels mounted to the vehicle body, each of the underbody closeout panels including:
        a panel body attached at the rear end of the vehicle body between the rear bumper fascia panel and a respective one of the rear wheel wells, the panel body extending across and covering a portion of the undercarriage; and
        a pair of elongated air strakes attached to and projecting generally orthogonal from the panel body, each of the air strakes including an elongated strake body extending longitudinally with respect to the vehicle body and having an inboard-facing curvature with a distinct curvature profile, the elongated strake body having a substantially uniform width and height along a length thereof,
    wherein the air strakes are configured to guide airflow traveling fore-to-aft along the undercarriage in an inboard and aft direction to thereby increase static pressure on the rear end of the motor vehicle.

14. A method of forming an underbody panel for improving aerodynamic characteristics of a motor vehicle, the motor vehicle including a vehicle body with a front end, a rear end, a rear wheel well, and an undercarriage, the method comprising:
    forming a panel body configured to attach to the vehicle body aft of the rear wheel well and adjacent the rear end of the vehicle body, the panel body being configured to cover at least a portion of the undercarriage; and
    attaching an elongated air strake to the panel body such that the air strake projects from the panel body, the air strake including an elongated strake body extending longitudinally with respect to the vehicle body and having an inboard-facing curvature, the elongated strake body having a substantially uniform width along a length of the air strake,
    wherein the air strake is configured to guide airflow traveling fore-to-aft along the undercarriage in an inboard direction to thereby increase static pressure on the rear end of the motor vehicle.

15. The method of claim 14, wherein the air strake includes first and second elongated air strakes attached to and projecting from the panel body.

16. The method of claim 15, wherein the air strakes are attached such that the first air strake is longitudinally spaced from the second air strake with respect to the vehicle body.

17. The method of claim 15, wherein the first air strake has a first length and the second air strake has a second length less than the first length.

18. The method of claim 15, wherein the first air strake has a first inboard-facing curvature profile and the second air strake has a second inboard-facing curvature profile that is distinct from the first inboard-facing curvature profile.

19. The method of claim 14, wherein the panel body is formed with an elongated profile and with a contoured lower-most surface.

20. The method of claim 14, wherein the forming and the attaching includes integrally forming the panel body and the air strake as a single-piece, unitary structure.

* * * * *